United States Patent
Smith et al.

[11] Patent Number: 5,336,893
[45] Date of Patent: Aug. 9, 1994

[54] HAFNIUM STANNATE PHOSPHOR COMPOSITION AND X-RAY INTENSIFYING SCREEN

[75] Inventors: Kyle Smith, Pittsford; Barbara J. Fisher, Rochester; Philip S. Bryan, Webster; Paul M. Hoderlein, Rochester, all of N.Y.

[73] Assignee: Eastman Kodak Company, Rochester, N.Y.

[21] Appl. No.: 63,178

[22] Filed: May 18, 1993

[51] Int. Cl.$^5$ .............................................. C09K 11/67
[52] U.S. Cl. ............................ 250/483.1; 252/301.4 F
[58] Field of Search ................ 250/483.1; 252/301.4 F

[56] References Cited

U.S. PATENT DOCUMENTS

| | | |
|---|---|---|
| 2,542,336 | 2/1951 | Kröger et al. |
| 4,068,128 | 1/1978 | Chenot et al. |
| 4,112,194 | 9/1978 | Chenot et al. |
| 4,664,985 | 5/1987 | Matsuoka et al. |
| 4,988,880 | 1/1991 | Bryan et al. |
| 4,988,881 | 1/1991 | Bryan et al. |
| 4,994,205 | 2/1991 | Bryan et al. |
| 5,250,366 | 10/1993 | Nakayama et al. ......... 252/301.4 R |

Primary Examiner—Paul M. Dzierzynski
Assistant Examiner—Richard Hanig
Attorney, Agent, or Firm—Robert Luke Walker

[57] ABSTRACT

A phosphor composition which comprises oxygen and a combination of elements satisfying the relationship:

$$[(Hf_{1-z}Zr_z)_{1+x}Sn_{1-x}]_{1-y}Ti_{2y}$$

wherein:

x is in the range of from about −0.4 to 0.95

2y is in the range of from 0 to 0.5 and z is in the range of from 0 to 0.5

These phosphors exhibit an orthorhombic crystal structure, and are useful in intensifying screens for producing a latent image in a silver halide radiographic element when imagewise exposed to X-radiation.

16 Claims, No Drawings

HAFNIUM STANNATE PHOSPHOR COMPOSITION AND X-RAY INTENSIFYING SCREEN

FIELD OF INVENTION

The present invention relates to phosphor compositions for use in X-ray intensifying screens, and X-ray intensifying screens which utilize these phosphors.

BACKGROUND OF THE INTENTION

X-ray intensifying screens have in the past been used in combination with silver halide containing radiographic films to reduce the exposure of patients to X-rays. Intensifying screens typically consist of a support and a phosphor layer. The phosphor layer, which absorbs X-radiation more efficiently than the silver halide, is capable of emitting a longer wavelength radiation to the adjacent silver halide emulsion layer of the radiographic element in an image pattern corresponding to that of the X-radiation received.

The efficiency of absorption of the X-radiation by the phosphor is attributable to some extent to the density of the phosphor crystals. Higher density phosphors absorb radiation more efficiently than lighter compositions. One common phosphor composition, gadolinium oxy sulfide ($Gd_2O_2S$), has a density of about 7.3 g/cm$^3$. It would be desirable to develop a variety of useful phosphor host compounds having higher densities, since theoretically, for such phosphors thinner intensifying screens could be employed, resulting in increased resolution.

Several such high density luminescent compositions have been decribed. Titanium activated hafnium oxide, for example, has a density of about 9.7 g/cm$^3$. Phosphor compositions of this type are described in U.S. Pat. No. 4,988,880 to Bryan et al. Other high density phosphor compositions include hafnium germanate and lutetium tantalate.

In addition, there are a variety of intensifying screens, each of which emit different wavelengths of the electromagnetic spectrum. Consequently, there is a continuing need for high density phosphor compositions which emit at different wavelengths. There is also a continuing need for phosphors which exhibit improved luminescence intensities.

SUMMARY OF THE INVENTION

We have unexpectedly discovered a particular stoichiometry of hafnium stannate that produces a crystal structure unlike that of either of the crystal structures typically produced for hafnium oxide or tin oxide. Whereas hafnium oxide normally has a monoclinic crystal structure and tin oxide is normally tetragonal, the compositions of the present invention exhibit an orthorhombic crystal structure. These compositions which result in orthorhombic crystals exhibit excellent density and luminescence emission properties.

Phosphors of the present invention comprise oxygen and elements satisfying the relationship:

$$[(Hf_{1-z}Zr_z)_{1+x}Sn_{1-x}]_{1-y}Ti_{2y}$$

wherein:
x is in the range of from about −0.4 to 0.95,
2y is in the range of from 0 to 0.5,
z is in the range of from 0 to 0.5, and said phosphors comprise an orthorhombic crystal structure.

In the hafnium stannate phosphors of the present invention, the highest percentage of orthorhombic crystals are formed when the atomic ratio of hafnium to tin is about 7:3, thus corresponding to $Hf_7Sn_3O_{20}$. Similar effects are found in a range of compositions of approximately the 7:3 stoichiometry, such as, for example, 8:2 or 6:4. Minor substitutions, such as the replacement of a portion of the hafnia and tin with an activator such as titanium can be made without affecting the orthorhombic crystal structure. In addition, it is difficult to obtain pure hafnium which is free of zirconium. However, a significant amount of orthorhombic crystals are still present even when up to about 50 atomic percent of the zirconium is substituted for hafnium, without significantly affecting the luminescence intensity of the phosphor. The hafnium stannate phosphors of the present invention provide a dense (8.8 g/cm$^3$) host phosphor whose emission band is centered at around 490 nm.

The phosphors of the present invention are capable of absorbing X-radiation and emitting longer wavelength electromagnetic radiation in the spectral region to which silver halides exhibit native sensitivity.

Consequently, these phosphors are useful in X-ray intensifying screens. Intensifying screens generally include a support and a layer comprising the above-described phosphor and an organic binder that is transparent to X-radiation and to radiation emitted when the phosphor is excited by X-radiation.

DETAILED DESCRIPTION OF THE INVENTION

In accordance with the present invention, a hafnium stannate host phosphor composition is provided which exhibits an orthorhombic crystal structure. The phosphors of the present invention comprise oxygen and elements satisfying the relationship:

$$[(Hf_{1-z}Zr_z)_{1+x}Sn_{1-x}]_{1-y}Ti_{2y} \qquad (I)$$

wherein x is in the range of from about −0.4 to about 0.95, 2y is in the range of from about 0 to about 0.5, and z is in the range of from about 0 to about 0.1.

More preferably, x is in the range of about −0.4 to about 0.8, 2y is in the range of from about 0.0001 to about 0.2, and z is in the range of from about 0 to 0.1.

While hafnium oxide normally exhibits a monoclinic crystal structure and tin oxide normally is tetragonal, the compositions of the present invention exhibit an orthorhombic crystal structure. Preferably, the phosphors of the present invention comprise a substantially monophasic orthorhombic crystal structure. By substantially monophasic, it is meant that the intensity ratio of the orthorhombic crystal present is at least 50 percent, as determined by the method set forth in "A METHOD OF QUANTITIVE ANALYSIS WITHOUT STANDARDS", by L. S. Levin, S. Appl. Crys., Vol. 10, pp. 147–150 (1977). More preferably, the intensity ratio is at least 60 percent, and most preferably, the intensity ratio is at least 70 percent. The composition of the present invention which result in orthorhombic crystals exhibit excellent density and luminescent emission properties.

The hafnium stannate phosphors containing the orthorhombic phase are those that satisfy the relationship:

$$D_{1+x}Sn_{1-x} \qquad (II)$$

where

D is hafnium and/or zirconium and x is in the range of from about −0.4 to about 0.95. More preferably x is in the range of from about −0.2 to about 0.8.

In a preferred embodiment of the invention the hafnium zirconium stannate phosphor is titanium-activated. The titanium activated phosphors of the present invention are capable of emitting principally in the 400–650 nm region of the electromagnetic spectrum, and are primarily centered at or near 490 nm. These titanium activated phosphors exhibit improved luminescence intensities. As long as hafnium, zirconium, and tin are present in the ratios indicated, the titanium activated phosphors of the present invention also exhibit a orthorhombic structure.

A preferred phosphor composition, which consists essentially of monophasic orthorhombic crystals is:

$$[(Hf_{0.99}Zr_{0.01})_{1.4}Sn_{0.6}]_{1-y}Ti_{2y}O_4$$

However, as mentioned above, $(Hf_{1-z}Zr_z)$ to Sn ratios do not have be exactly 7:3 to form substantially monophasic orthorhombic crystals. To the contrary, $(Hf_{1-z}Z_{1-z})$ to Sn ratios may range from about 8:2 to about 6:4, with the result still being a relatively high level of intensity. For example, compared to conventional titanium activated hafnium-zirconium phosphors, emission increases of about 18 percent are possible. It is preferred that the titanium activator satisfy the relationship:

$$[D_{1+x}Sn_{1-x}]_{1-y}Ti_{2y} \qquad (III)$$

where

D and x are as previously defined and 2y is in the range from about zero to 0.5. More preferably, 2y is in the range of from about 0.0001 to about 0.4. Most preferably, 2y is in the range of from about 0.001 to about 0.1.

The ratio of hafnium and zirconium can be widely varied, although it is preferred that the zirconium content be less than the hafnium content.

While the purest obtainable forms of hafnium can be employed in the practice of this invention without intentionally incorporating zirconium, except as an impurity, it is not necessary to incur the significant expense of using high purity hafnium to realize the advantages of this invention. For example, optical grade hafnia, which has a zirconium concentration of less than $3 \times 10^{-4}$ mole Zr/mole Hf, is neither required nor preferred for use in the practice of the invention.

In the composition of the invention the content of hafnium and zirconium preferably satisfies the relationship:

$$Hf_{1-z}Zr_z \qquad (IV)$$

where z is in the range from about zero to 0.5. More preferably, z is in the range from 0 to 0.1. Most preferably, z is from about 0.0001 to about 0.005.

In the preferred form of the invention the phosphor consists essentially of hafnium, zirconium, tin, titanium and oxygen. Since hafnium, zirconium and tin are each present in the phosphor in a tetravalent (+4) oxidation state, there are 2 oxygen atoms for each atom, alone or in combination, of these metals. The titanium activated hafnium zirconium stannate phosphors of the present invention can be employed to form intensifying screens. Intensifying screens typically comprise a support onto which is coated a phosphor layer containing the titanium activated hafnium zirconium stannate phosphor in particulate form and a binder for the phosphor particles. Titanium-activated hafnium zirconium stannate phosphors can be used in the phosphor layer in any conventional particle size range and distribution. Generally, the use of smaller mean particle size phosphor crystals results in increased resolution. Preferred mean particle sizes are in the range of from about 0.5 μm to about 40 μm and more preferably from about 1 μm to 20 μm.

The method of making the phosphors of the present invention is not critical, and any of the methods and techniques commonly used to make phosphors are applicable.

In a preferred embodiment for preparing the phosphor composition of the present invention, commercially available sources of tin, zirconium, and hafnium are intimately intermixed as solids or dissolved in a common solvent, followed by coprecipitation. The starting materials are chosen so that upon firing only the metal and oxygen atoms remain as residue, any other moieties of the compounds being thermally decomposed or otherwise driven off during firing.

A preferred tin starting material is tin oxalate ($SNC_2O_4$), while a preferred hafnium starting material is hafnium oxalate hydrate ($H_2HfO(C_2O_4)_2$ hydrate). Other representative and exemplary hafnium and zirconium starting materials and exemplary methods useful in the formation of the phosphor composition of the present invention (by substitution of appropriate starting materials) are disclosed in U.S. Pat. Nos. 4,988,880 to Bryan, et al., 4,988,881 to Bryan, et al., and 5,017,791 to Bryan, et al, the disclosures of which are hereby incorporated by reference.

The fluorescence efficiencies of the phosphors of the present invention are increased by blending a small amount of an activator such as titanium with the phosphor host prior to firing. Such activation can be undertaken according to any conventional technique. Examples of useful techniques are disclosed in U.S. Pat. Nos. 5,017,791 to Bryan, et al., 2,542,336 to Kröger, et al., J. F. Sarver, "Preparation and Luminescent Properties of Ti-Activated Zirconia", 113 *Journal of the Electrochemical Soc'y.* 124–28 (February, 1966), and L. H. Brixner, Structural and Luminescent Properties of the $Ln_2Hf_2O_7$-Type Rare Earth Hafnates", 19 *Mat. Res. Bull.* 143–49 (1984), the disclosures of which are hereby incorporated by reference.

The phosphors of the present invention can be blended with other phosphors, if desired, to form an intensifying screen having optimal properties for a particular application. Intensifying screen constructions containing more than one phosphor-containing layer are also possible, with the present phosphors being present in one or more of the phosphor-containing layers.

Sufficient binder is present to give structural coherence to the phosphor-containing layer. The binders can be identical to those conventionally employed in fluorescent screens. Such binders are generally chosen from organic polymers which are transparent to X-radiation and emitted radiation, such as: sodium o-sulfobenzaldehyde acetal of poly(vinyl alcohol), chlorosulfonated poly(ethylene), a mixture of macromolecular bisphenol poly(carbonates) and copolymers comprising bisphenol carbonates and poly(alkylene oxides), aqueous ethanol soluble nylons, poly(alkyl acrylates and methacrylates) and copolymers of alkyl acrylates and methacrylates with acrylic and methacrylic acid, poly(vinyl butyryl) and poly(urethane) elastomers. These and other useful binders are disclosed in U.S. Pat. Nos. 2,502,529, 2,887,379, 3,617,285, 3,300,310, 3,300,311, and 3,743,833, and in *Research Disclosure*, Vol. 154, February 1977, Item 15444, and Vol. 182, June 1979, all of which are hereby incorporated by reference. Particularly preferred intensifying screen binders are poly(urethanes).

The support onto which the fluorescent layer is coated can be selected from those normally employed in radiographic intensifying screens. Examples of the support materials typically utilized in intensifying screens include plastic films of polymers such as cellulose acetate, e.g., cellulose triacetate, polyesters such as poly(ethylene terephthlate), polyamide, polyimide, and polycarbonate; metal sheets such as aluminum foil and aluminum alloy foil; ordinary papers; baryta paper; resin-coated papers; papers containing pigments such as titanium dioxide or the like; and papers sized with poly(vinyl alcohol) or the like. Most commonly, the support is a polymeric film. For highest levels of image sharpness the support is black or is transparent and is mounted for exposure in a cassette with a black backing. For the highest attainable speeds a white support, such as a titania or barium sulfate loaded or coated support is employed. Specifically preferred reflective supports which offer a balance of speed and sharpness are those containing reflective microlenslets, such as are disclosed in U.S. Pat. No. 4,912,333 to Roberts, et al.

Any one or combination of conventional intensifying screen features, such as overcoats, subbing layers, and the like, compatible with the features described above can also be employed. Conventional radiographic element and intensifying screen constructions are disclosed in *Research Disclosure*, Vol. 184, August 1979, Item 18431, the disclosure of which and the patents cited therein are hereby incorporated by reference. *Research Disclosure* is published by Kenneth Mason Publications, Ltd., Emsworth, Hampshire P010 7DD, England.

The invention may be more easily comprehended by reference to the following specific examples. It must be understood, however, that these examples are provided for purposes of illustration and that the invention may be practiced otherwise than as specifically illustrated without departing from the spirit and scope of the invention. For example, the invention is not confined to the particular experimental conditions, reagents, or stoichiometries cited in the examples.

EXAMPLES

Method of Sample Evaluation

Each of the phosphors in the following examples was prepared by the thermal decomposition of the appropriate stoichiometric amounts of: $H_2HfO(C_2O_y)_2$ hydrate (which had previously been prepared from $HfOCl_2$ hydrate and oxalic acid), $H_2ZrO(C_2O_4)_2$ hydrate (which had previously been prepared from $ZrOCl_2$ hydrate and oxalic acid), $SnC_2O_4$ and $(NH)_2TiO(C_2O_4)_2$. The desired amounts of each precursor were weighed, ground using an agate mortar and pestle, and then heated in 20 ml alumina crucibles having alumina covers. The samples were heated to 600° C. for one hour and then to 1000° C. for six hours. Following heating, the samples were again ground using an agate mortar and pestle and returned to the same crucible. The samples were then heated to 1400° C. for twelve hours.

The relative luminescence response of each phosphor was measured by first packing a phosphor powder sample of each example into an aluminum planchet (2 mm high×24 mm diameter) at a coverage of about 0.32 g/cm$^2$. The samples were then irradiated with filtered X-radiation. The X-ray source used was a tungsten target tube in an X-ray generator operating at 28 kVp and 30 mA. The X-ray beam was filtered through 1.31 mm aluminum and 0.05 mm molybdenum filters. The luminescence response was measured using a photomultiplier tube operated at 500 V bias. The voltage from the photomultiplier tube was measured using a high impedance microvolt digital multimeter.

The prompt emission spectra of each sample was obtained by first packing powder samples of each example into an aluminum planchet (2 mm×24 mm diameter) at a coverage of about 0.32 g/cm$^2$. Each sample was then irradiated with unfiltered X-radiation from a tungsten-target tube operated at 70 kVp and 10 mA in a General Electric XRD 6 ™ X-ray generator. The prompt emission response was measured using a grating spectrometer coupled to an intensified linear diode array detector. Data acquisition and processing were controlled by a Princeton Applied Research Model 1460 OMA III ™ optical multichannel analyzer. Each of the resultant prompt emission spectra was corrected to compensate for the spectral response of the detector-spectrograph combination.

EXAMPLES 1-8

Examples 1-8 demonstrate the relative luminescence intensity of the phosphors of the present invention as a function of the titanium concentration in hafnium stannate.

In these examples, the base composition was $[(Hf_{0.99}Zr_{0.01})_{1.4}Sn_{0.6}]_{(1-y)}Ti_{2y}O_4$, and the titanium level was varied according to Table 1, below. The relative intensity of each composition is listed in Table 1 below, with the luminescence intensity of Example 1 (no titanium) being assigned an arbitrary value of 100 to provide a point of reference.

TABLE I

| Example | 2y | Relative Intensity |
| --- | --- | --- |
| 1 | 0 | 100 |
| 2 | 0.0001 | 154 |
| 3 | 0.001 | 299 |
| 4 | 0.01 | 758 |
| 5 | 0.05 | 597 |
| 6 | 0.1 | 356 |
| 7 | 0.2 | 245 |
| 8 | 0.5 | 29 |

The prompt emission spectra of Examples 1-4 showed two emission bands centered at approximately 342 nm and at 490 nm. The only significant emission observed for Examples 5-8, on the other hand, was centered at 490 nm. Note that the best response was seen where 2y was 0.01 (Example 4). Note that the highest luminescence intensity was obtained in compositions having a titanium concentration in the range of from about 0.001 to 0.05.

EXAMPLES 9-16

These examples demonstrate the relative luminescence intensity as a function of the tin concentration in the phosphors of the present invention.

In these examples, the base composition was $[(Hf_{0.99}Zr_{0.01})_{1+x}Sn_{1-x}]_{0.995}Ti_{0.01}O_4$, and the tin concentration was varied according to Table 2, below. The relative prompt emission luminescent intensity of each composition is listed in Table II, below, relative to the intensity of Example 1, discussed above, which was assigned a value of 100.

TABLE II

| Example | x | Relative Intensity (Ex. 1 = 100) |
|---|---|---|
| 9 | 1.0 | 621 |
| 10 | 0.8 | 348 |
| 11 | 0.6 | 507 |
| 12 | 0.4 | 755 |
| 13 | 0.2 | 601 |
| 14 | 0.0 | 539 |
| 15 | −0.2 | 461 |
| 16 | −0.4 | 388 |

Note the high relative intensity exhibited by Example 12, the composition of which is $[(HF_{0.99}Zr_{0.01})_{1.4}Sn_6]_{0.995}Ti_{0.01}O_4$ (x=0.4). Example 12 exhibited a monophasic orthorhombic crystal structure. In Example 9 (x=1), the composition of which is $Hf_{1.9701}Zr_{0.0199}Ti_{0.01}O_4$, the relative intensity is about 18% less than the response of the monophasic hafnium zirconium stannate of Example 12. No orthorhombic crystals were detected (by X-ray diffraction) in Example 9. Examples 10 and 11 contained both monoclinic as well as orthorhombic hafnium zirconium stannate crystals. Examples 13-16 contained both tetragonal and orthorhombic crystals. The relative intensity of each composition is listed in Table II, with 100 being equal to the intensity of Example 1, as discussed above. The results of Examples 9-16 indicate that as the ratio of orthorhombic crystals increases in phosphor compositions containing hafnium, zirconium and tin, the relative luminescence intensity increases. As x was decreased from 1 to −0.4, the prompt emission spectra shifted slightly from about 490 nm (in the case of Example 9) to about 500 nm (in the case of Example 16).

EXAMPLES 17-23

Examples 17-23 demonstrate the relative prompt emission intensity as a function of Zr concentration in the phosphor compositions of the present invention.

In these examples, the base composition was $(Hf_{1-z}Zr_z)_{1.390}Sn_{0.6}Ti_{0.01}O_4$. The relative prompt emission luminescence intensity of each composition is listed in Table III below, relative to the intensity of Example 1, discussed above, which was assigned a value of 100.

TABLE III

| Example | z | Relative Intensity (Ex. 9 = 100) |
|---|---|---|
| 17 | 0.0 | 687 |
| 18 | 0.0001 | 720 |
| 19 | 0.001 | 709 |
| 20 | 0.005 | 762 |
| 21 | 0.01 | 589 |
| 22 | 0.1 | 575 |
| 23 | 0.5 | 413 |

As demonstrated by Table III, the highest responses occurred when z was less than or equal to 0.005. X-ray diffraction analyses of Examples 17-21 revealed only a monophasic orthorhombic crystal structure. Example 22 was nearly monophasic, with only about 2 percent monoclinic crystals in addition to the orthorhombic crystal phase. Example 23 contained small amounts of monoclinic (about 15 percent) and tetragonal (about 10 percent) intermixed with the orthorhombic crystal phase.

EXAMPLE 24

This Example illustrates the preparation of an intensifying screen using phosphors in accordance with the present invention. A hafnium stannate phosphor having the composition $(Hf_{0.99}Zr_{0.01})_{1.393}Sn_{0.597}Ti_{0.01}O_4$ was prepared as described in Examples 1-8. The phosphor was mixed with a solution of polyurethane in a methylene chloride and methanol mixture with 21 parts of phosphor to 1 part of binder by weight. This mixture was agitated on a paint shaker for 3 hours using zirconia bead media. The resulting dispersion was coated on a blue "Estar" polyester support at a coverage of about 2.76 g/dm$^2$. When excited by X-rays from a tungsten target tube operated at 28 kVp and 30 mA and filtered with 1.31 mm of aluminum and 0.05 mm of molybdenum, this coating gave a response from a photomultiplier tube that was 0.77 times as large as a typical signal obtained using a (CaWO$_4$) screen and 0.35 times that of a typical signal obtained using a commercial gadolinium oxysulfide screen.

Crystallographic Analysis

Many of the samples formed in the above examples were submitted for quantitative X-ray diffraction analysis of phases present in phosphor samples. The phases identified were: $[(Hf_{1-z}Zr_z)_{1+x}Sn_{1-x}]_{1-y}Ti_{2y}O_4$, $HfO_2/ZrO_2$ (monoclinic), $SnO_2$ (cassiterite), and $TiO_2$ (rutile). Quantification of the phases was based on an intensity ratio method set forth in "A METHOD OF QUANTITIVE ANALYSIS WITHOUT STANDARDS", by L. S. Zevin, J. Appl. Crys., Vol 10, pages 147-150 (1977). The results, which are listed in Table IV below, are reported to the nearest whole weight percent.

TABLE IV

| Sample | Orthorhombic HfZrSnTiO | Monoclinic HfO$_2$/ZrO$_2$ | Tetragonal SnO$_2$ | Tetragonal TiO$_2$ |
|---|---|---|---|---|
| 1 | 100 | — | — | — |
| 2 | 100 | — | — | — |
| 3 | 100 | — | — | — |
| 4 | 100 | — | — | — |
| 5 | 100 | — | — | — |
| 6 | 100 | — | — | — |
| 7 | 99 | — | — | 1 |
| 8 | 96 | — | — | 4 |
| 9 | — | 100 | — | — |
| 10 | 29 | 71 | — | — |
| 11 | 78 | 22 | — | — |
| 12 | 100 | — | — | — |
| 13 | 90 | — | 10 | — |
| 14 | 68 | — | 32 | — |
| 15 | 38 | — | 62 | — |
| 16 | 8 | — | 92 | — |
| 18 | 100 | — | — | — |
| 19 | 100 | — | — | — |
| 20 | 100 | — | — | — |
| 21 | 100 | — | — | — |
| 22 | 98 | 2 | — | — |
| 23 | 75 | 15 | 10 | — |

The invention has been described in detail with particular reference to preferred embodiments thereof, but it will be understood that variations and modifications can be effected within the spirit and scope of the invention which is defined by the following claims.

What is claimed is:

1. A phosphor composition comprising oxygen and elements satisfying the relationship:

$$[(Hf_{1-z}Zr_z)_{1+x}Sn_{1-x}]_{1-y}Ti_{2y}$$

wherein:
x is in the range of from −0.4 to 0.95,
2y is in the range of from 0 to 0.5, and
z is in the range of from 0 to 0.5
wherein said phosphor comprises an orthorhombic crystal structure.

2. A phosphor composition according to claim 1, wherein said phosphor consists of a substantially monophasic orthorhombic crystal structure.

3. A phosphor composition according to claim 2, wherein x is in the range of from about −0.2 to about 0.8.

4. A phosphor composition according to claim 2, wherein 2y is in the range of from about 0.0001 to about 0.2.

5. A phosphor composition according to claim 2, wherein z is in the range of from about 0 to about 0.1.

6. A phosphor composition according to claim 1, wherein the ratio of hafnium and zirconium to tin is about 7 to 3.

7. A phosphor composition according to claim 1, wherein x is in the range of from about −0.2 to about 0.8.

8. A phosphor composition according to claim 7, wherein 2y is in the range of from about 0.0001 to about 0.2.

9. A phosphor composition according to claim 8, wherein z is in the range of from about 0 to 0.1.

10. A phosphor composition according to claim 9, wherein said phosphor consists of a substantially monophasic orthorhombic crystal structure.

11. An X-ray intensifying screen comprising
a support; and
a layer comprising an organic binder that is transparent to X-radiation and to radiation emitted when the layer is excited by X-radiation and a phosphor capable of absorbing X-radiation and emitting longer wavelength electromagnetic radiation, said phosphor comprising oxygen and combined elements satisfying the relationship:

$$[(Hf_{1-z}Zr_z)_{1+x}Sn_{1-x}]_{1-y}Ti_{2y}$$

wherein:
x is in the range of from −0.4 to 0.95
2y is in the range of from 0 to 0.5, and
z is in the range of from 0 to 0.5
wherein said phosphor comprises an orthorhombic crystal structure.

12. An X-ray intensifying screen according to claim 11, wherein x is in the range of from about −0.2 to about 0.8.

13. An X-ray intensifying screen according to claim 12, wherein 2y is in the range of from about 0.0001 to about 0.2.

14. An X-ray intensifying screen according to claim 13, wherein z is in the range of from about 0 to about 0.1.

15. An X-ray intensifying screen according to claim 11, wherein 2y is in the range of from about 0.0001 to about 0.2.

16. An X-ray intensifying screen according to claim 11, wherein z is in the range of from about 0 to about 0.1.

* * * * *